No. 742,627. PATENTED OCT. 27, 1903.
C. W. GILLIS.
ANIMAL TRAP.
APPLICATION FILED SEPT. 23, 1902.
NO MODEL.
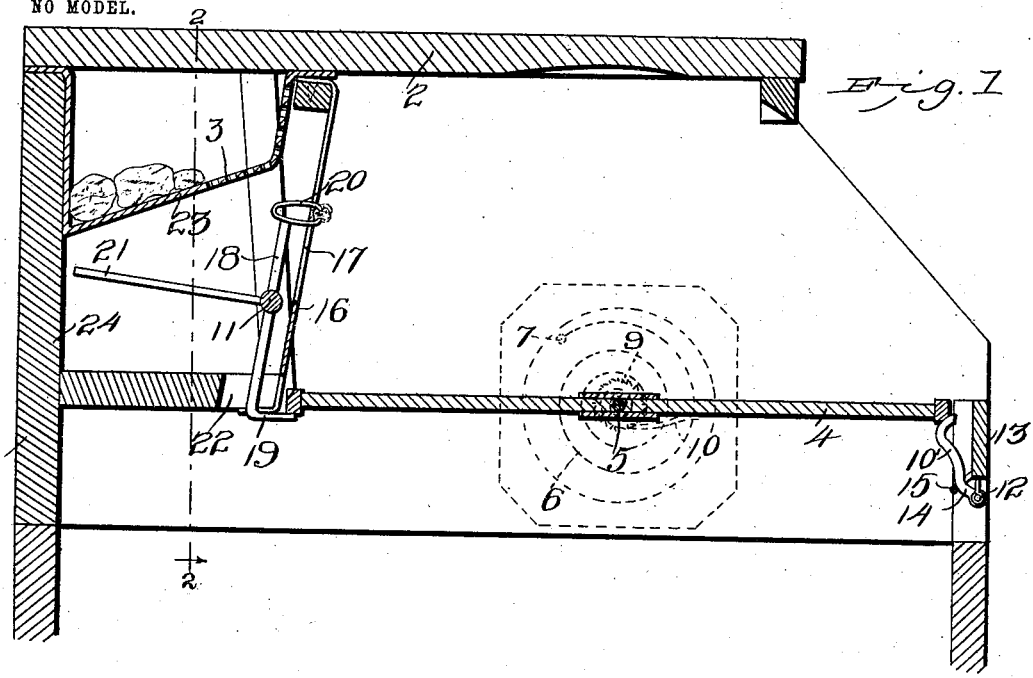
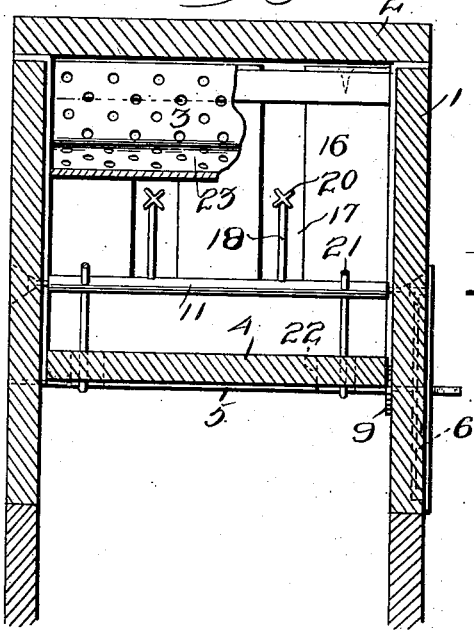
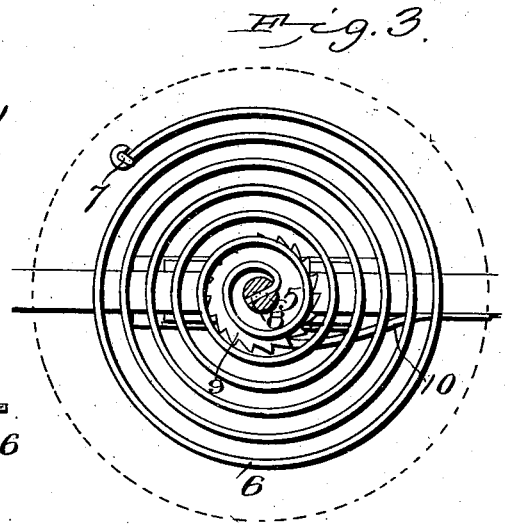
Witnesses
E. H. Stewart
J. H. Riley
C. W. Gillis, Inventor.
by C. A. Snow & Co.
Attorneys No. 742,627.

Patented October 27, 1903.

UNITED STATES PATENT OFFICE.

CYRUS W. GILLIS, OF ANDALUSIA, ALABAMA.

ANIMAL-TRAP.

SPECIFICATION forming part of Letters Patent No. 742,627, dated October 27, 1903.

Application filed September 23, 1902. Serial No. 124,581. (No model.)

*To all whom it may concern:*

Be it known that I, CYRUS W. GILLIS, a citizen of the United States, residing at Andalusia, in the county of Covington and State of Alabama, have invented a new and useful Animal-Trap, of which the following is a specification.

The invention relates to improvements in animal-traps.

The object of the present invention is to improve the construction of animal-traps and to provide a simple, inexpensive, and efficient one designed to capture and destroy small animals, such as rats or mice, and capable of automatically setting itself after it has been sprung, whereby a considerable number of animals may be captured before it requires attention.

The invention consists in the construction and novel combination and arrangement of parts hereinafter fully described, illustrated in the accompanying drawings, and pointed out in the claims hereto appended.

In the drawings, Figure 1 is a longitudinal sectional view of a trap constructed in accordance with this invention. Fig. 2 is a vertical sectional view on the line 2 2 of Fig. 1. Fig. 3 is a detail view illustrating the arrangement of the coiled spring which actuates the rotary platform.

Like numerals of reference designate corresponding parts in all the figures of the drawings.

1 designates a casing having an open bottom and designed in practice to be arranged over a bucket, tank, or other receptacle partially filled with water for the purpose of drowning the captured animals. The casing is provided with a removable top or cover 2 to afford access to a bait-receptacle 3 and to the other parts of the trap. Mounted between the sides of the casing is a rotary platform 4, arranged on and supported by a transverse shaft 5, which is connected with a coiled spring
6. The coiled spring 6, which is mounted on one side of the casing in a suitable recess thereof, is secured at its outer end 7 to the casing, and its inner end 8 is connected with the shaft 5, which is preferably provided with a perforation for the reception of the end of the spring; but the inner end of the spring may be secured to the shaft by means of a pin or other suitable fastening device. When the spring is secured in this manner, the pin will pass through a perforation of its inner end and through a perforation of the shaft. The shaft, which is extended beyond the casing, as illustrated in Fig. 4, is adapted to be rotated to wind up the spring, and it carries a ratchet-wheel 9, suitably fixed to the shaft and engaged by a resilient pawl 10, mounted on the rotary platform. By this construction the shaft is adapted to be rotated independently of the platform to wind up the spring.

The platform is centrally pivoted by means of the shaft, and it is normally held in a horizontal position by means of a catch 10' and a tripping device 11. The catch 10' is located beneath the outer end of the platform to prevent the latter from being depressed or tilted by the weight of an animal entering the trap, and it is pivoted at its lower end by a suitable pin 12 or other suitable pivot to the front end piece 13 of the casing. The front end piece 13 is provided with a recess 14 to receive the catch, which is normally supported at a slight inclination by a loop or keeper 15, and the upper portion of the catch is curved to form a support for the platform and to present an inclined edge to the same when the platform is rotated, whereby the catch is readily swung backward by the platform. As soon as the platform passes the catch the latter drops back into its initial position to prevent any retrograde movement of the platform.

The casing is provided with a slightly-inclined partition 16, arranged at the inner end of the platform and provided with slots 17 for a purpose hereinafter described. The tripping device consists of a transverse rock-shaft provided with upwardly-extending bait-holding arms 18 and depending platform-supporting arms 19, which are normally held in position for supporting the platform. The bait-holding arms are provided at their upper ends with suitable jaws or clamps 20, projecting forward through the slots 17 and adapted to receive a suitable bait for attracting the animals. The depending arms 19 are approximately L-shaped and extend forward beneath the platform and are adapted to be withdrawn from such position by the forward movement of the upwardly-extending bait-supporting arms. The lower arms 19 may be made of sufficient weight to return them quickly to their initial position after the trap has been sprung to prevent the platform from making more than a one-half revolution at each operation of the trap; but arms 21 may be employed for weighting the rock-shaft to secure such result. A spring or any other means may be provided for this purpose.

The casing is provided with bottom openings 22 to receive the depending platform-supporting arms 19, and the partition is slotted adjacent to the same. A bait-receptacle 23 is arranged within the upper portion of the space between the partition 16 and the rear end wall 24 of the casing. This receptacle, which may be of any desired construction, is preferably made of sheet metal bent into the form of a tray and provided at the top with supporting-flanges. The inner or front portion of the tray or receptacle is inclined and is provided with perforations to partially expose its contents and to permit the animals to smell the bait. The bait receptacle or tray is removable to enable it to be readily cleaned or supplied with bait, and any suitable means may be employed for firmly holding the top or cover in position.

It will be seen that the trap is simple and comparatively inexpensive in construction, that it is exceedingly sensitive, and that it automatically resets itself until it is run down.

What is claimed is—

In an animal-trap, the combination with a casing having one of its walls recessed, of a shaft pivoted in the casing, a platform mounted on the shaft, a spring mounted in the recess in the casing and connected with and tending to actuate the shaft in one direction to rotate the platform, a pawl-and-ratchet connection between said shaft and platform for permitting rotation of the shaft in the opposite direction independently of the platform to wind the spring, a partition mounted in the casing and forming a compartment in rear of the platform, a removable perforated bait-holding receptacle mounted within the compartment, a bait-holder pivoted adjacent to the inner end of the platform and provided with a catch for engaging beneath the same, a weight for actuating the bait-holder to maintain the catch normally in engaging position, and a gravity-catch pivoted adjacent to the outer end of the platform for engagement beneath the same to prevent retrograde movement of the platform.

In testimony that I claim the foregoing as my own I have hereto affixed my signature in the presence of two witnesses.

CYRUS W. GILLIS.

Witnesses:
C. S. O'NEAL,
HENRY J. LAW.